US012277609B1

(12) United States Patent
Shaw et al.

(10) Patent No.: US 12,277,609 B1
(45) Date of Patent: Apr. 15, 2025

(54) MATCHMAKING ATTENDEES FOR VIRTUAL, IN-PERSON, AND HYBRID EVENTS

(71) Applicant: RingCentral, Inc., Belmont, CA (US)

(72) Inventors: Justin Shaw, Richmond, VA (US); Remo Kommnick, Richmond, VA (US); Jagoda Pietrzak, Poznan (PL)

(73) Assignee: Ringcentral, Inc., Belmont, CA (US)

( * ) Notice: Subject to any disclaimer, the term of this patent is extended or adjusted under 35 U.S.C. 154(b) by 208 days.

(21) Appl. No.: 17/740,022

(22) Filed: May 9, 2022

(51) Int. Cl.
*G06Q 50/00* (2024.01)
*H04L 67/306* (2022.01)
*H04L 67/50* (2022.01)

(52) U.S. Cl.
CPC ........... *G06Q 50/01* (2013.01); *H04L 67/306* (2013.01); *H04L 67/535* (2022.05)

(58) Field of Classification Search
None
See application file for complete search history.

(56) References Cited

U.S. PATENT DOCUMENTS

| | | | | |
|---|---|---|---|---|
| 11,475,635 B1* | 10/2022 | Boufarhat | ............... | H04N 7/141 |
| 2005/0289582 A1* | 12/2005 | Tavares | ............ | H04N 21/25891 |
| | | | | 725/10 |
| 2008/0046281 A1* | 2/2008 | Teicher | ................... | A63F 13/30 |
| | | | | 705/319 |
| 2008/0215623 A1* | 9/2008 | Ramer | ................... | G06Q 30/08 |
| 2012/0089464 A1* | 4/2012 | Teicher | ................... | G06Q 10/02 |
| | | | | 705/14.66 |
| 2014/0025654 A1* | 1/2014 | Brown | ................... | H04L 67/535 |
| | | | | 707/705 |
| 2014/0081882 A1* | 3/2014 | Govindaraman | ...... | G06Q 50/01 |
| | | | | 705/319 |
| 2014/0095607 A1* | 4/2014 | Fraccaroli | ............... | H04W 4/21 |
| | | | | 709/204 |
| 2014/0129579 A1* | 5/2014 | Bramhall | ............... | G06Q 50/01 |
| | | | | 707/758 |
| 2019/0190874 A1* | 6/2019 | Petrosian | ................ | G06F 16/29 |
| 2021/0076002 A1* | 3/2021 | Peters | ................... | H04N 7/152 |

(Continued)

OTHER PUBLICATIONS

Yin, Z., Xu, T., Zhu, H. et al. Matching of social events and users: a two-way selection perspective. World Wide Web 23, 853-871 (2020). https://doi.org/10.1007/s11280-019-00724-7 (Year: 2020).*

(Continued)

*Primary Examiner* — Andrew B Whitaker
(74) *Attorney, Agent, or Firm* — Ansari Katiraei LLP; Arman Katiraei; Sadiq Ansari

(57) ABSTRACT

Media, methods, and systems are provided for matchmaking for in-person, virtual, and hybrid events are disclosed. Event attendees may be added to a networking pool When the networking pool reaches a capacity, the event attendees may be added to other event attendees. Networking events may be one-to-one meetings or group meetings. Group meetings may be dedicated to a topic. Event attendees may be matched to other attendees or to a group meeting based on interest and behavioral data associated with the event attendee. When the networking event ends, the event attendees may be added back into the networking pool for further networking events.

20 Claims, 7 Drawing Sheets

(56) References Cited

U.S. PATENT DOCUMENTS

2023/0196682 A1* 6/2023 Boufarhat ............ H04L 12/1881
345/419

OTHER PUBLICATIONS

Matching of social events and users: a two-way selection perspective (Year: 2020).*
Grip Event Matchmaking, https://www.grip.events/event-matchmaking, accessed May 9, 2022.

* cited by examiner

MATCHMAKING ATTENDEES FOR VIRTUAL, IN-PERSON, AND HYBRID EVENTS

TECHNICAL FIELD

Embodiments of the invention generally relate to facilitating networking between event attendees for online events. More specifically, certain embodiments of the invention relate to matchmaking event attendees to facilitate networking for virtual, in-person, and hybrid events.

Networking is an essential component of both career and professional network development. As more events transition from being hosted in-person to being hosted virtually, in-person networking opportunities have failed to carry over as traditional virtual conferencing platforms offer poor networking opportunities. These virtual conferencing platforms are typically used to host virtual meetings between multiple users but offer no way for users to break off into smaller networking sessions.

Further, in-person events are deficient in effectively facilitating matchmaking between attendees. Typically, attendees must seek out other attendees based on their nametag or location at an expo booth, for example. Attendees may miss out on networking attendees simply by not seeing a specific expo booth or attendee that they may wish to network with. Furthermore, in-person events fail to suggest other attendees or booths to the attendee that the attendee may wish to network with.

What is needed are systems and methods for matchmaking virtual event attendees to promote networking during virtual, in-person, and hybrid events. Further, what is needed is an event system that improves networking for both on-site attendees and virtual attendees.

SUMMARY

Embodiments of the invention address the above-identified needs by providing mechanisms for matchmaking attendees for virtual, in-person, and hybrid events. Attendees may join a networking pool. When the networking pool reaches a capacity, the attendees may be matched to other attendees in the networking pool. The attendees may be matched based on shared interests between the attendees. Additionally, factors such as behavioral data and attendee location may influence matchmaking. The attendees may be matched in one-to-one networking events and/or group networking events. In some embodiments, an attendee may specify whether said attendee is attending the event in-person, and the in-person attendee may elect to only be matched with other in-person attendees. When the networking event ends, the attendee may be added back into the networking pool to network with other attendees. In some embodiments, the matchmaking is configured to prevent repeat matching of attendees.

A first embodiment is directed to one or more non-transitory computer-readable media storing computer-executable instructions that, when executed by a processor, perform a method for matchmaking for an event, the method comprising adding a first event attendee of a plurality of event attendees to a networking pool, responsive to the networking pool reaching a capacity, matching the first event attendee to a second event attendee in the networking pool to obtain a match, initiating, for the match, a networking event, and responsive to an end of the networking event, adding the first event attendee and the second event attendee back to the networking pool. The first event attendee may be matched with the second event attendee based in part on a first set of interest data associated with the first event attendee and a second set of interest data associated with the second event attendee.

A second embodiment is directed to a method for matchmaking for an event, the method comprising receiving, from an event attendee of a plurality of event attendees, a selection of a networking event of a plurality of networking events, responsive to receiving the selection of the networking event, joining the event attendee to the networking event, and responsive to the networking event reaching a threshold number of event attendees, initiating the networking event. The networking event may comprise at least one presenter seat configured to be assigned to an event attendee of the plurality of event attendees. The at least one presenter may grant a set of privileges for the networking event.

A third embodiment is directed to a system for matchmaking for an event, the system comprising a processor, a data store, and one or more non-transitory media storing computer-executable instructions that, when executed by the processor, perform a method for matchmaking for the event, the method comprising adding a plurality of event attendees to a networking pool, responsive to the networking pool reaching a capacity, matching the plurality of event attendees to obtain a plurality of matches, and responsive to a meeting end, adding the plurality of event attendees back to the networking pool. Each event attendee of the plurality of event attendees may be matched based in part on a set of interest data associated with each event attendee. The plurality of event attendees may comprise at least one in-person event attendee.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
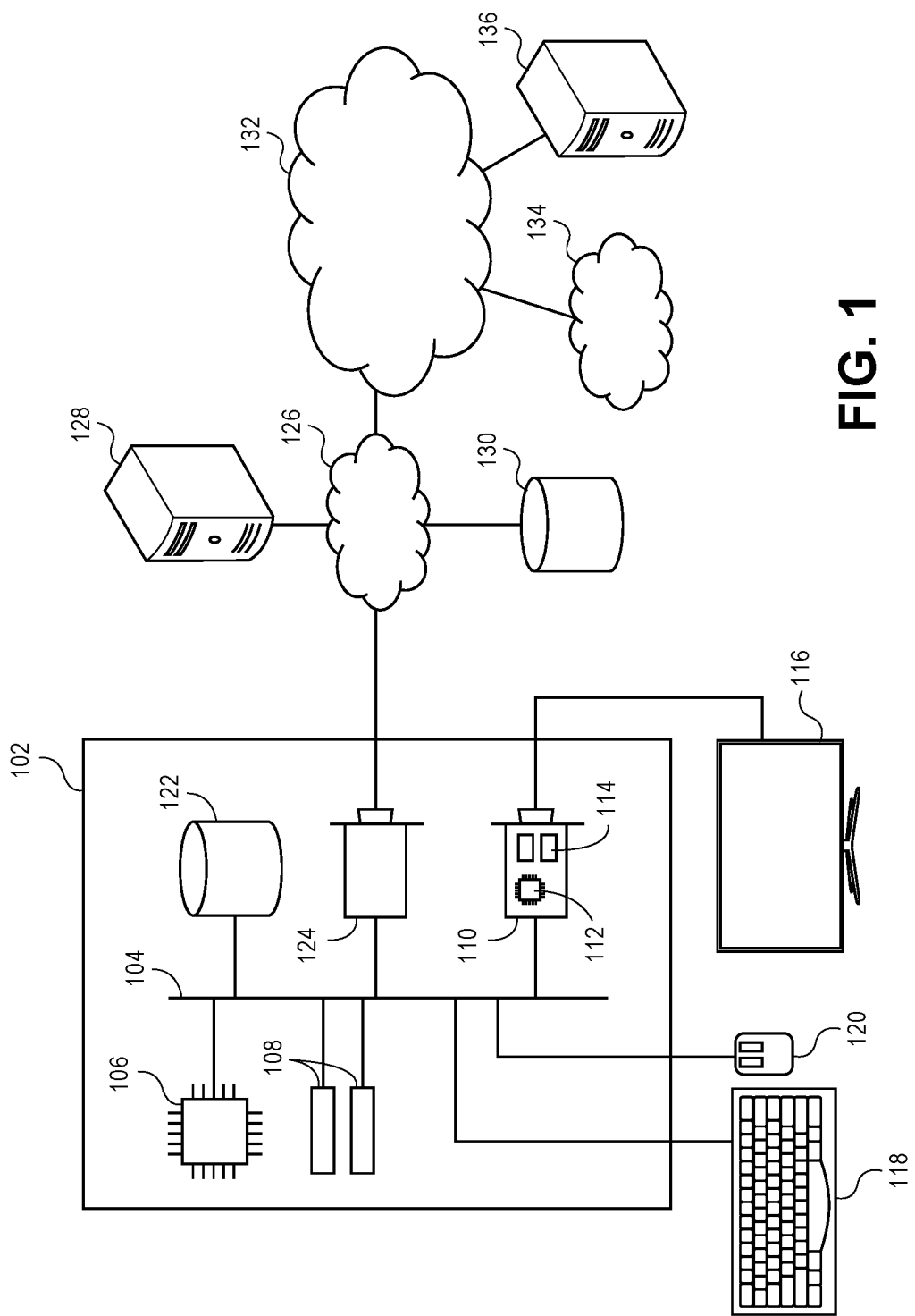
FIG. 1 depicts an exemplary hardware platform for some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Context and Concepts of the Invention

Generally, embodiments are directed to an event hosting system for facilitating networking for attendees of virtual events, in-person events, and hybrid events. Attendees may be added to a networking pool for networking with other attendees. When the networking pool reaches a capacity, the attendees may be matched. The attendees may be matched in one-to-one networking events or group networking events. Attendees may be matched based on known interests, behavioral data, and any other data associated with the attendees. Once the networking event ends, the attendees may be added back to the networking pool to participate in additional networking events with other attendees. In some embodiments, the attendees may attend the events in-person or virtually and access the event hosting system at any time. An event organizer or other authorized user may set up networking events. The event organizer may also be a presenting user and/or an attendee. Any user may attend, present, host, and create events.

In some embodiments, the events may be conferences hosted by companies or a plurality of companies providing workshops. The events may be associated with a particular field such as, for example, cybersecurity. A plurality of cybersecurity companies may reserve stages, both in-person and virtually, for presenting products and advancements in the field. Some events may be conferences for advancements in technology or continued learning such as medical conferences where certifications for attending the events may be provided. Upon completion of the event, documents for certification may be provided requiring the attendees' in-person signature or electronic signature on digital documents. The digital documents may be provided by the event hosting system or by an integrated application provided by a third-party source.

In some embodiments, events may be library events featuring new books or read-alongs for children. Some events may be provided for public school boards to meet virtually with parents or for schoolteachers to meet with students. The networking events described herein may be one-on-one evaluation or tutoring periods. Any virtual or in-person meeting that may be imagined may be supported by the event hosting system as described in embodiments herein.

In some embodiments, events comprise a plurality of communication connections between presenters and attendees. Events may comprise event activities including stages, sessions, networking events, workshops, expos, and any other platforms for connecting presenters, sponsors, attendees, and any other user that has access to attend the event. In some embodiments, any user that has access to attend any part of an event either in-person or virtually may be generally referenced as an attendee; however, in some embodiments described below, in-person attendees and virtual attendees are distinguished. Stages may provide a virtual platform for presenters to present to an audience of attendees via a live (or time-shifted) broadcast. The attendees may attend the stage virtually via a user interface comprising a video display or in-person at the location of the stage. The user interface may allow the attendee access to view the presentation live or recorded and chat with other attendees and the presenter by text, audio, and video communication.

In some embodiments, the event comprises one or more sessions. The sessions may allow attendees to communicate directly with a presenter via one or more video interfaces. An attendee may provide audio and video such that the presenter and other attendees may hear and see the attendee. Generally, the sessions may provide a virtual communication platform for providing question and answer sessions between the attendees and the presenting users.

In some embodiments, the event includes one or more expos in which sponsors may promote products and services provided by the sponsors. The expos may be virtual booths for presenting information on exemplary topics such as company future expectations, products, services, and any other information that may be useful in traditional expo format. The expos may be provided by the user interface and may display any video, images, descriptions, and may include third-party application integrations for engagement by the attendees.

In some embodiments, the virtual event hosting system may track user interactions within the virtual events and integrate with applications of mobile devices to track user locations when the user is attending an event in person or virtually. The application may provide virtual event analytics to the event creator or organizer, data customer and data brokers, and offer customized scheduling to attendees based on a user profile and the user interactions to provide a customized user experience.

In some embodiments, the event hosting system may provide no- or minimal-contact registration and check-in. The event hosting system may provide a graphical user interface (GUI) to present registration options for events to be attended in person or virtually. The registration options may include access to event activities such as stages, sessions, workshops, network connections and expos, at various prices. The registration options may be presented by the GUI to a potential attendee. The potential attendee may select any of the registration options and submit an electronic payment to register for the event. In some embodiments, the registration is associated with a user profile, an organization profile, and/or an event registration profile such that the user may attend from any location on-site or virtually without submitting a ticket in-person.

In some embodiments, the event includes networking opportunities. The networking opportunities may provide time-limited communications between attendees at the events. The attendees may be connected to other attendees randomly, based on interests shared between the attendees, or the connections may be pre-selected by an organizer or by the attendees. Networking events may be one-to-one networking meetings or group networking meetings. The attendees may connect by the video interface described in embodiments herein. In some embodiments, the event hosting system is biased towards matching in-person attendees with other in-person attendees. In some embodiments, in-person attendees are directed towards a designated area of the event space to conduct their networking events. The networking process is described in detail below.

Operational Environment for Embodiments of the Invention

FIG. 1 illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 124 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Such non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, computer 102 may be generally referenced as an event hosting system. The event hosting system may be a web- or cloud-based application and may be provided on any computing device described in reference to computer 102 above. The event hosting system may access other computing devices, sensors, and applications stored on other computing devices as well as peripheral devices. The event hosting system may track user actions when interfacing with the event hosting system by accessing various applications associated with computer 102. In some embodiments, any data and access may be customized by the attendee. Furthermore, the event hosting system may access any applications stored on the mobile device of the attendee for attendee data to provide the attendee with a customized user experience.

Operation of Embodiments of the Invention

Figure 2:
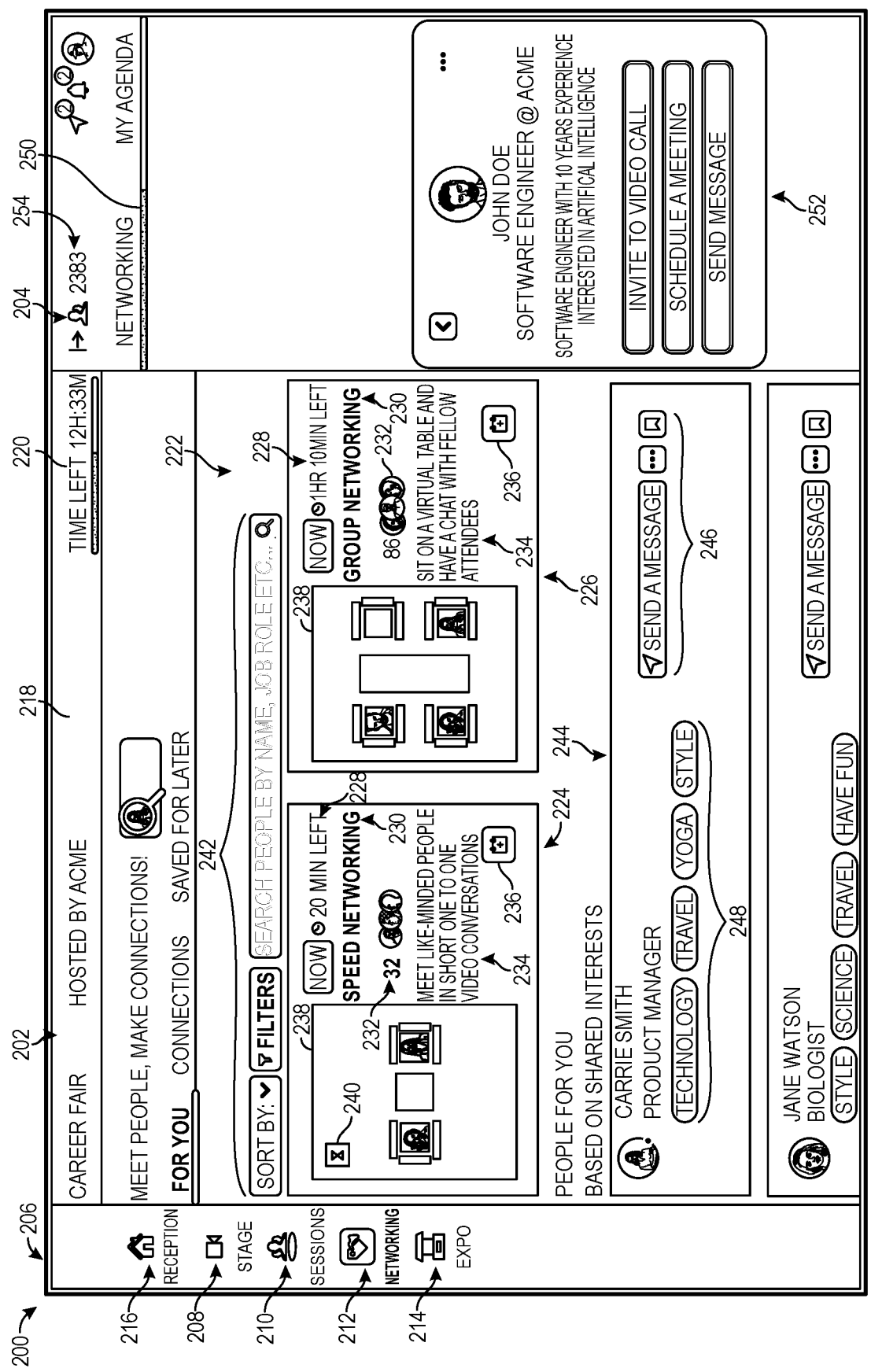
FIG. 2 depicts an event interface for some embodiments.

FIG. 2 illustrates an interface 200 for some embodiments. Interface 200 may comprise a networking pane 202, a sidebar pane 204, and a menu pane 206. As previously described, events may comprise stages 208, sessions 210, networking 212, and expos 214 that attendees may attend during the event. Attendees may access stages 208, sessions 210, networking 212, and expos 214 via the associated controls in menu pane 206. Reception 216 may serve as a homepage for the event.

Networking pane 202 may be displayed when networking 212 is the selected page of the event. Networking pane 202 may comprise a header pane 218. Header pane 218 may display various information for the event, such as an event title and/or an event host. In some embodiments, header pane 218 comprises an event time indicator 220 displaying the amount of time remaining for the event. Event time indicator 220 may take various forms such as a horizontal or vertical progress bar, a clock, or any other time display. Event time indicator 220 may also display a time start and/or a time end.

Networking pane 202 may display various networking information to the user in body pane 222. As described above, networking for events may be either one-to-one networking events or group networking events. Information for one-to-one networking may be displayed in one-to-one networking pane 224, and information for group networking may be displayed in group networking pane 226. One-to-one networking may comprise meetings between two event attendees. The two attendees may both be virtual attendees, both in-person attendees, or one attendee may be a virtual attendee while the second attendee is an in-person attendee. In such embodiments where one attendee is in-person, the in-person attendee may connect to the virtual attendee via the event hosting system to meet virtually with the virtual attendee. In some embodiments, in-person attendees are more likely to be matched with other in-person attendees, as detailed below.

Group networking events may comprise meetings between three or more event attendees. Group networking event attendees may be all virtual, all in-person, or a combination of virtual and in-person. In some embodiments, group networking events are dedicated to a specific topic. For example, a career fair event may have a group networking event dedicated to a specific company or industry, while a ComicCon event may have a group networking event dedicated to the latest superhero film. For networking sessions having in-person attendees, the event hosting system may direct in-person attendees to a suitably equipped area of the event space (e.g., a conference room) to conduct their portion(s) of the networking event, as discussed further below with respect to FIG. 6.

Networking panes 224, 226 may comprise a networking time indicator 228, a networking title 230, participants preview 232, description 234, calendar control 236, and meeting preview 238. Networking time indicator 228 may display the amount of time remaining for the networking session. In some embodiments, networking events have a set time. For example, a ten-minute networking event may comprise ten, one-minute rapid networking sessions. Attendees may be matched, conduct a networking event, placed back into the networking pool, and matched to a new attendee for a new networking event. This process may then repeat for the duration of the networking time as illustrated in networking time indicator 228.

Networking title 230 may display a title for the networking session. In some embodiments, networking title 230 is configurable by the event organizer and/or may be dynamically generated based on the event, as discussed further below. Participants preview 232 may display a number of joined event attendees. In some embodiments, if the networking event has a capacity, participants preview 232 illustrates the capacity of the networking event and/or the number of spots remaining. Participants preview 232 may also display profile pictures for at least a subset of joined attendees. The networking event may comprise a description 234. Description 234 may outline the event and provide additional details on the meeting topic, meeting presenters, meeting purpose, and the like.

Calendar control 236 may be actuated by the attendee to add the event to their calendar. In some embodiments, the event hosting system comprises various integrations with other software. For example, the event hosting system may integrate with GOOGLE Calendar, MICROSOFT OUTLOOK, or any other calendar system such that a user may actuate calendar control 236 and have the networking event added to their calendar. In some embodiments, the attendee's personal calendar may be integrated and accessible in the event hosting system. In some embodiments, the event hosting system may push data to an externally stored calendar which may display information for the networking event.

Networking preview 238 may display a preview of the networking event. For example, as shown in one-to-one networking pane 224, the two attendees who have been matched together have their profile pictures displayed in two chairs arranged around a table. Similarly, in group networking pane 226, the presenting attendees have their profile pictures displayed in chairs around a table. In some embodiments, networking panes 224, 226 comprise a timed event indicator 240 indicative that the networking meeting is a timed event. For example, one-to-one networking meetings may have a minimum time (e.g., 30 seconds) and a maximum event time (e.g., 180 seconds). In some embodiments, timed event indicator 240 may be selected or hovered over to display the time parameters for the meeting.

Body pane 222 may also comprise controls 242. For example, and as shown, controls 242 may comprise a sort control, a filter control, a search control, or any combination thereof. In some embodiments, the sort control may be used to sort between different types of networking events (e.g., between one-to-one networking and group networking events) and/or to sort events by their start or end times. Similarly, filter and search controls may allow for users to filter and search networking meetings. Networking events may be filtered by their meeting topics or start and end times, for example. In some embodiments, the search box is configured to allow users to search for other event attendees. Event attendees may be searched by various data associated therewith, such as name, job title, company, interests, or any other information known about the attendee. Searched event attendees may have their attendee profile displayed in sidebar pane 204. In some embodiments, the search box may be configured to search networking events by type, name, categories, and the like.

Body pane 222 may comprise a suggested connections pane 244 which may display other attendees determined by the event hosting system that the user may wish to network and connect with. Similar to matching attendees, suggested connections may be determined based in part on shared interests. As shown, suggested connections pane 244 may display two suggested connections but any number of displayed suggested connections are considered within the scope of embodiments herein. Suggested connections pane 244 may comprise connection controls 246 for interacting with the suggested connection. Connection controls 246 may comprise a send message control and/or a save connection control. Saved connections may be viewed in a connections tab of body pane 222. In some embodiments, the send message control causes the display of an email pane pre-filled with the suggested connection's email to provide an efficient method of communicating with other attendees. Alternatively, or additionally, the send message control may open a chat between the two attendees. Chats may be displayed in sidebar pane 204 and/or may appear as a pop-up window in interface 200. In some embodiments, an ellipse control may be actuated to display additional controls, such as a dismiss button to remove the suggested connection from suggested connections pane 244. Suggested connections pane 244 may display various information about the suggested connection such as a profile picture, a name, a job title, and tags 248.

In some embodiments, tags 248 are categorical tags associated with the user. Tags 248 may represent the attendee's known interests such that the attendee may be matched to other attendees sharing similar interests. The tags 248 may be received by the attendee and/or determined based in part on interaction data, behavioral data, or any other data gathered or received from the event hosting system. In some embodiments, attendees are prompted to provide the event hosting system with tags 248 upon registering for the event and/or upon entering the event. In some embodiments, attendees select tags 248 that are predefined by the event organizer. Alternatively, or additionally, attendees may input their own tags 248. In some embodiments, tags 248 are event-specific such that an attendee who attends two separate events hosted by the event hosting system does not share tags 248 between the separate events. In some embodiments, tags 248 are specific to an event host or an event type. For example, if an attendee attends two separate career fair events, tags 248 may carry over between these two similar events. As another example, events hosted by the same company via the event hosting system may share tags 248. In some embodiments, users can select to have tags 248 carried over from event to event.

Tags 248 may be used as interest data to determine matches for networking. Attendees sharing similar tags 248 may be more likely to be matched with one another. For example, the attendee Carrie Smith may be matched to the attendee Jane Watson based in part on the "travel" tag 248 shared therebetween. In some embodiments, a threshold number of shared tags 248 is required for attendees to be considered for a match. For group networking events, shared tags 248 between attendees may be set as the meeting topic. For example, if Carrie Smith and Jane Watson are matched with a third attendee for a group networking event who also has the "travel" tag 248, the meeting topic for the group networking event may be automatically set to "travel."

Tags 248 may be determined dynamically for an attendee throughout an event. Data such as attended sessions 210 and stages 208, chat messages, poll responses, and the like may be used to assign tags 248 to an attendee. For example, an attendee who attends a session 210 on artificial intelligence may be assigned a tag 248 for artificial intelligence. Meanwhile, an attendee who attends the session 210 on artificial intelligence but leaves shortly after the session 210 begins may be less likely to be matched with the attendee who attended the entire session 210. Accordingly, tags may have an associated weight used to determine their applicability for matching.

Sidebar pane 204 may display various auxiliary information for the event. Sidebar pane 204 may comprise various tabs 250 which may be toggled to display associated information. As shown, tabs 250 may comprise a networking tab and an agenda tab. In some embodiments, tabs 250 comprise a chat tab for chatting with other attendees and/or a polling tab for participating in polls during the event. The networking tab may display various information for networking events, such as the attendee profile 252 of the matched attending in a one-to-one networking event. An agenda tab 250 may display schedule information for the event, such as a list of sessions 210 and expos 214 the attendee is scheduled to attend. Sidebar pane 204 may also display event participants count 254 displaying the current number of event participants.

In some embodiments, when an attendee registers for the event, the attendee creates an attendee profile 252. Attendee profile 252 may comprise information indicative of the attendee such as name, identification number, contact information, likes, dislikes, tags 248, and biometric information such as image, iris, fingerprint, palmprint, and any other biometric information that may be used to identify the attendee. Any registration and analytics data associated with the attendee may be stored at and accessed from the attendee profile 252. The data stored in attendee profile 252 may be used to verify the identity of the attendee for contactless check-in to the event as well as for easy registration and payment for future events.

Attendee profiles 252 may be displayed in sidebar pane 204 and may comprise various controls for interacting with the displayed attendee profile 252. As shown, controls may be present for inviting the attendee to a video call, scheduling a meeting with the attendee, or sending a message to the attendee. In some embodiments, attendee profile 252 may comprise links to various third-party sites or files, such as a link to the attendee's social media account and a file link for accessing the attendee's resume. Attendee profiles 252 may also comprise a biography for the attendee. The biography may detail job information, interests, or any other information provided by the attendee.

Figure 3:
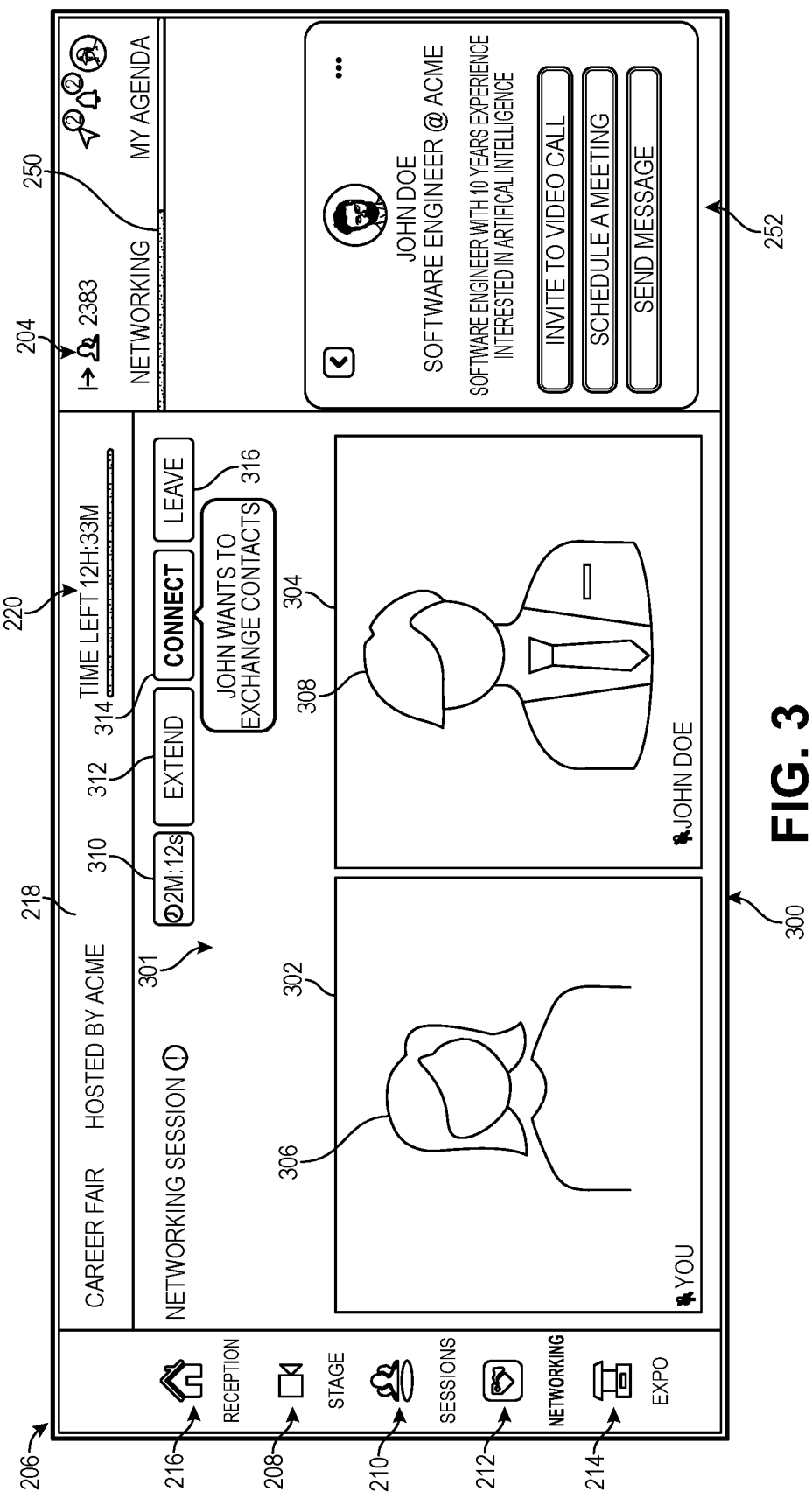
FIG. 3 depicts a networking interface for some embodiments.

FIG. 3 illustrates a networking interface 300 for some embodiments. Where common features or elements are unchanged, they are not discussed separately from their discussion with respect to FIG. 2. In some embodiments, users are taken to networking interface 300 upon the start of a one-to-one meeting or group networking meeting. Alternatively, networking interface 300 may be displayed upon the user clicking within one-to-one networking pane 224 or group networking pane 226 in interface 200. As shown, networking interface 300 may comprise a media pane 301 comprising a first video pane 302 and a second video pane 304. The first video pane 302 may be associated with a first attendee 306, and the second video pane 304 may be associated with a second attendee 308. Attendees 306, 308 may be able to share video, audio, and various other data in video panes 302, 304.

In some embodiments, attendees 306, 308 are matched on a first-come, first-served basis. As such, the networking pool may only have a single attendee at a time. For example, first attendee 306 may join the networking pool and be the only attendee in the networking pool. When second attendee 308 joins the networking pool, second attendee 308 may be matched to first attendee 306. In some embodiments, attendees may request to block other attendees to prevent matching with blocked attendees. Consequently, in such embodiments where first-come, first-served matchmaking is employed, the networking pool may be larger than one if an attendee has been blocked. In some embodiments, attendees may fill the networking pool and may be randomly matched with other attendees. Once matched and the networking meeting concludes, the attendees may be added back to the networking pool and matched with other attendees. In some embodiments, matchmaking is configured to prevent re-matching of attendees.

Attendees 306, 308 may also be matched based on shared interests, behavioral data, and the like. In some embodiments, the networking pool does not operate on a first-come-first-served basis and matches may be created upon the networking pool filling or based on a timer. In some embodiments, shared tags 248 between attendees 306, 308 are used in part to determine the match. In embodiments where tags are weighted, the tag weights may be used to influence the likelihood of two users matching. In some embodiments, behavioral data such as a stage 208 or session 210 attended and/or time spent at a stage 208 or session 210 may influence matchmaking. Similarly, interactions such as time spent with other attendees may be used to determine matching. The matchmaking process is discussed in detail with respect to FIG. 5. Networking interface 300 may further comprise time indicator 310 indicative of the length of time remaining for the meeting. As previously described, meetings may be configured with a minimum and/or a maximum time length.

Networking interface 300 may comprise various meeting controls for modifying the meeting. In some embodiments, attendees 306, 308 may prolong the meeting past the maximum time length using extend control 312. Actuation of extend control 312 by an attendee (e.g., first attendee 306) may cause the display of a control box (not shown) allowing first attendee 306 to send an offer to second attendee 308 to extend the meeting. In some embodiments, preset extension times (e.g., 30 seconds, three minutes, etc.) are displayed in the control box and/or first attendee 306 may input a time extension. Once received, the offer may be presented to second attendee 308 whereby second attendee 308 may choose to decline or accept the offer to extend the meeting. In some embodiments, upon declining the meeting extension, second attendee 308 is presented with an option to offer to extend the meeting for a different time length than that proposed by first attendee 306.

A connect control 314 may allow attendees 306, 308 to exchange contact information. Actuation of connect control 314 by first attendee 306 may cause the sending of the first attendee's 306 contact information to the second attendee 308. Second attendee 308 may then actuate connect control 314 on their display to send their contact information back to first attendee 306. In some embodiments, the contact information is displayed in the connections tab in body pane 222 and/or in sidebar pane 204. In some embodiments, the event hosting system receives and stores contact information from attendees 306, 308 when registering for the event, entering the event, or at any other time during or after the event. Alternatively, or additionally, the event hosting system may integrate with various third party systems that store contact information.

To leave the meeting, attendees 306, 308 may actuate leave control 316. In some embodiments, upon leaving the meeting, attendees 306, 308 are placed back into the networking pool to match with a different attendee. In some embodiments, leave control 316 is disabled until the meeting time eclipses the minimum meeting time. In some embodiments, leaving the meeting prior to reaching the minimum meeting time requires that both attendees 306, 308 actuate leave control 316. In some embodiments, attendees 306, 308 are kept in networking interface 300 while waiting for a new attendee to network with.

In some embodiments, networking events are monitored to determine if the match is going poorly. For example, an absence of audio data shared between attendees 306, 308 may indicate that the attendees 306, 308 are a poor match. The attendees 306, 308 may then be prompted to end the meeting early. Similarly, if it is determined that the networking event is going well, such as by analyzing audio data or the facial expressions of attendees 306, 308, the attendees 306, 308 may be suggested to prolong the meeting or to contact each other after the meeting ends.

In some embodiments, attendees 306, 308 are prompted to leave a review of the meeting after the meeting ends. This review data may be used to match attendees 306, 308 with other attendees. Additionally, such review data and any other data may be used to train the matchmaking system using various machine learning methods in order to better match attendees.

While FIG. 3 has been discussed herein with respect to a one-to-one meeting, it should be noted that group networking events may comprise a substantially similar interface for conducting said event. Additional video panes 302, 304 may be provided for the additional attendees participating in the group networking event.

Figure 4:
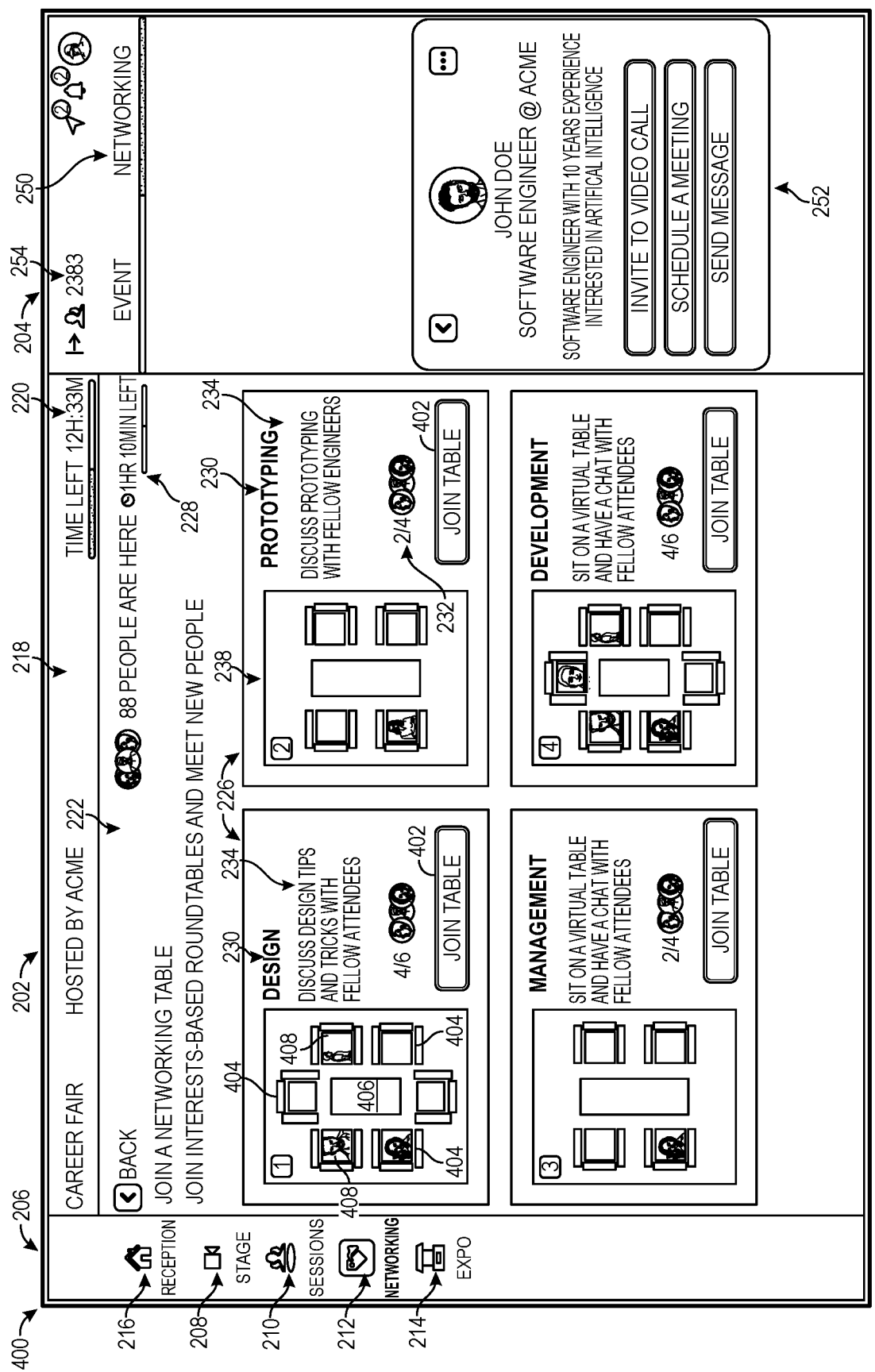
FIG. 4 depicts a group networking interface for some embodiments.

Turning now to FIG. 4, group networking page 400 is illustrated for some embodiments. Where common features or elements are unchanged, they are not discussed separately from their discussion with respect to FIG. 2 and FIG. 3. In some embodiments, group networking page 400 is displayed responsive to an attendee selecting group networking pane 226 in interface 200, or upon the start of a group networking event.

Group networking page 400 may display various group networking panes 226. As previously described, each group networking meeting may be dedicated to a specific topic. For example, as shown, one group networking meeting is directed towards "design" and a second towards "prototyping." In some embodiments, group networking events are suggested to a user based on the meeting topic, joined attendees, and various other factors. For example, if the meeting topic is similar to a tag 248 for the attendee, the group networking event may be suggested to the attendee. Similarly, as an example, if first attendee 306 had a successful one-to-one networking event with second attendee 308, and second attendee 308 joins a group networking event, said group networking event may be suggested to first attendee 306 based on the positive connection with second attendee 308.

Meeting topics may be presented by an event organizer or by a creating or authorized attendee for the group networking event. Embodiments are also contemplated wherein meeting topics are determined dynamically throughout the event by the event hosting system. For example, using various natural language processing techniques (e.g., topic segmentation, etc.) the event may be monitored and topics of interest determined therefor. Audio data for an event may be analyzed to generate a transcript from which keywords may be determined to generate meeting topics. Additionally, or alternatively, event descriptions, presenters, tags 248, and other like data may be used to determine topics of interest. Similarly, meeting topics may be updated dynamically during a group networking event and displayed via group networking pane 226. As such, newly-joined attendees may be presented with the most up-to-date topic of the group meeting. In some embodiments, multiple attendees may be matched together based on similar interest and/or behavioral data, and the matched attendees may vote on or select a meeting topic to discuss. In still other embodiments, no meeting topic is set for a group networking event.

In some embodiments, attendees may join a group networking event via join table control 402. In some embodiments, attendees may add a group networking event to their calendar and are automatically joined to the group networking event upon event start or shortly before event start. Alternatively, attendees may join the networking pool and be matched based on shared interests and behavioral data as described in embodiments herein. In still other embodiments, attendees are added based on a first-come, first served basis. Networking events may begin once a threshold number of attendees have joined or based on a timer. In some embodiments, the threshold number of attendees is the number of presenter seats 404 for the group networking event.

As illustrated, group networking events may be depicted and organized similar to conventional roundtable in-person meetings wherein meeting participants are assigned presenter seats 404 around a table 406. In some embodiments, those attendees who are assigned presenter seats 404 are granted higher privileges for the group networking event. Attendees assigned to presenter seats 404 for a group networking event are hereinafter referred to as meeting presenters 408. In some embodiments, meeting presenters 408 have permission to share audio, video, or other data (e.g., file sharing) to the group networking event. Non-presenting attendees of the group networking meeting may be assigned to "attendee seats" and may only have permissions to view the group networking event and/or participate in chat, polls, and other like functions. Attendees who join the networking event after all presenter seats 404 have been filled, or who do not have access to a presenter seat 404 may be automatically added to an attendee seat. In some embodiments, group networking events are organized such that all attendees have equal privileges for participating in the networking event.

When the roundtable group networking format is employed, various aspects thereof may be gamified to increase and encourage user participation. In some embodiments, the assignment of presenter seats 404 is gamified to increase desire to present in the group networking event. For example, attendees 306 may purchase a ticket, VIP access, or the like to receive higher odds or guaranteed access to presenter seats 404. In some embodiments, presenter seats 404 are assigned on a first-come, first-served basis.

In some embodiments, meeting presenters 408 may be demoted from presenter seats 404 based on various factors. As one example, a lack of participation from a meeting presenter 408 may result in that meeting presenter 408 being removed from a presenter seat 404. For example, a threshold length of time (e.g., five minutes) may be set, wherein if a meeting presenter 408 exceeds the threshold without sharing data to the group networking meeting, the meeting presenter 408 is removed from presenter seat 404. An attendee in an attendee seat may then be promoted to presenter seat 404.

Figure 5:
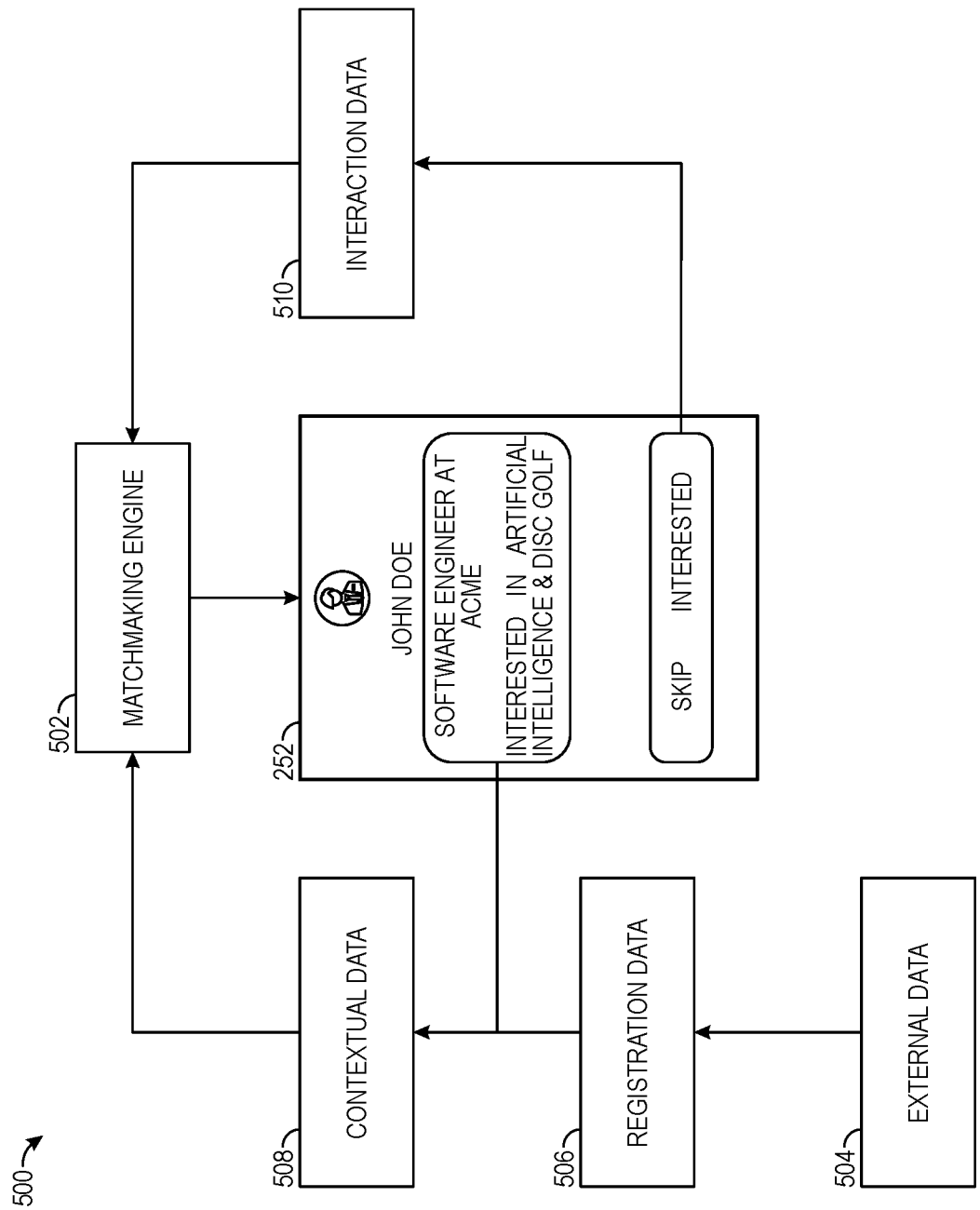
FIG. 5 depicts a matchmaking architecture for some embodiments.

FIG. 5 illustrates a matchmaking architecture 500 for some embodiments. Matchmaking architecture 500 may serve as the backend for matching attendees during the event. In some embodiments, matchmaking engine 502 is configured to match attendees based in part on external data 504, registration data 506, contextual data 508, interaction data 510, or any combination thereof.

Matchmaking engine 502 may bias matching attendees based on whether the attendees are attending the event in-person or virtually. For example, matchmaking engine 502 may only match in-person attendees with other in-person attendees who may wish to only network face-to-face. In some embodiments, the attendees may use a control (for example, via the event hosting system) to indicate onsite attendance to the event. Toggling of said onsite switch may prevent matchmaking to virtual attendees of the event. As discussed below, an in-person event 600 (see FIG. 6) may be equipped with various sensors for detecting the presence of an attendee and used by matchmaking engine 502 when performing matchmaking. As such, the presence of an attendee on site may be automatically determined. In some embodiments, attendees may elect to only match with in-person attendees or only match with virtual attendees, and matchmaking engine 502 may account for an attendee's preferences when matchmaking attendees.

Other rules-based variables may be considered by matchmaking engine 502 for obtaining matches. For example, for a career fair event, it may be undesirable to match job seekers with other job seekers or job recruiters with other job recruiters. As such, rules may be defined to prevent matches. In some embodiments, the rules are set by an event organizer. In some embodiments, the rules are set by the attendee, thereby providing a customized matchmaking experience for the attendee. The rules may be set based on tags 248 associated with the attendees. As such, a rule may be created defining that an attendee having a "recruiter" tag 248 will not match with other attendees having the "recruiter" tag 248. As another example, an attendee with a "dogs" tag 248 may elect to not be matched with attendees having a "cats" tag 248. In some embodiments, presenting attendees may elect to not match with other presenting attendees. In the event that the defined rules result in no matches being found for an attendee, the attendee may be added to a different networking pool. Alternatively, the attendee or event organizer may be notified that the defined rules were too strict and suggest that the rules should be loosened in order to create a match.

External data 504 may comprise any data ingested by the event hosting system from one or more external sources and may be used for matchmaking. In some embodiments, external data 504 comprises marketing data provided by external sources. The marketing data may be for attendees who have signed up for the event and/or may be related to organizations associated with the specific event. In some embodiments, third-party sites may promote events, and data from third-party sites may be stored. Data such as third-party views, view duration, clicks, and the like may be stored as external data 504.

In some embodiments, pre-event marketing campaigns may be run by organizations associated with the event. In some embodiments, tracking codes such as Urchin Tracking Module (UTM) codes may be used to track the pre-event marketing campaigns. The UTM codes may be created, tracked, and managed directly in a main page or dashboard of any event by the event organizer. The pre-event marketing data collected may be used for matchmaking attendees. For example, an attendee may register for a career fair event hosted by the event hosting system. The attendee may register via a third-party site which may display the various companies attending the career fair. Matchmaking engine 502 may then receive data such as which company's web pages on the third-party site the attendee visited, and use said data to match attendee to a recruiter for that company.

Registration data 506 may comprise data gathered during the registration process for the event. When an attendee registers for an event, various information may be gathered about the attendee which may, in turn, be used by matchmaking engine 502 for matchmaking. In some embodiments, the event hosting system may provide a graphical user interface (GUI) to present registration options of events to be attended in-person or virtually. The registration options may include access to event activities such as stages, sessions, workshops, network connections and expos, at various prices. Registration may be associated with attendee profile 252, an organization profile, and/or an event registration profile such that the user may attend from any location on-site or virtually without submitting a ticket in-person.

Contextual data 508 may comprise various data gathered about attendee 306 throughout the event. In some embodiments, contextual data 508 comprises tags 248 received by the event system during the event. As described above, attendees 306 may be prompted to select one or more tags 248 during the virtual event. These tags 248 may include information such as job title, employer, interests, and the like. For example, contextual data 508 may indicate that the attendee is a software engineer at Acme who is interested in artificial intelligence and disc golf. As such, matchmaking engine 502 may use this data to match attendee 306 with other software engineers interested in artificial intelligence, machine learning, or another related subject at the event, for example. Attendees may be matched based on personal and professional interests. As another example, an event hosted by event hosting system may be a ComicCon, and attendees 306 may input tags 248 relating to their favorite comic book character, publisher, author, illustrator, and the like. In some embodiments, matchmaking engine 502 suggests networking events to the user based on tags 248. For example, a group networking event dedicated to deep learning models may be suggested to all attendees interested in machine learning.

Interaction data 510 may comprise various behavioral data gathered about an attendee as the attendee participates in the event. As one example, interaction data 510 may comprise data relating to the sessions 210 the attendee has attended, such as session topics, session tags, session speakers, session descriptions, and the like. For example, a session description may be analyzed and keywords extracted therefrom to determine a topic of interest for the attendee. In some embodiments, the event hosting system prompts the attendee with a determined interest to confirm that the attendee is interested in the determined interest. The event hosting may also track the amount of time the attendee spent at a specific session 210 or stage 208. Similarly, stages 208, sessions, networking events, expos 214, and the like that the attendee did not attend or skipped may be stored as interaction data 510. For virtual events, the amount of time attendee 306 spends on the page for the session 210 may be tracked. For in-person events, the amount of time the attendee remained in the room or area where the session is being held may be tracked. In some embodiments, attendees check-in and out to specific sessions using RFID, a QR code on their mobile device, or the like. This data may then be used to determine the length of time an attendee 306 spent at a stage 208 or session 210 during an in-person event.

As another example, interaction data 510 may comprise an attendee's agenda. In some embodiments, attendees 306 may add future stages 208 and sessions 210 to the agenda. The stages 208 and sessions 210 added may then be used to determine interests for the attendee. For example, the description of a session 210 may be used to determine interests for the attendee. In some embodiments, attendees are matched to other attendees based on similarities between agendas.

As still another example, the browsing data of an attendee may be analyzed to extract interaction data 510. The browsing data may comprise stages 208, sessions 210, networking 212, expo 214, and other pages in the event that the attendee has accessed or visited. Further, files that the attendee has downloaded or accessed during the event may be leveraged. For example, if the attendee is at the career fair and downloads a company's brochure, matchmaking engine 502 may use this interaction data 510 to match the attendee to a job recruiter for that company. The browsing data may also comprise other attendee profiles 252 of other attendees which the attendee has visited. Similarly, the length of time spent and/or files viewed/downloaded (e.g., resumes) may be leveraged as interaction data 510 gathered from the browsing history of the attendee.

As described above, after a networking session, attendees may be prompted to leave a review of the networking session. In some embodiments, attendees are prompted to input a thumbs-up or thumbs-down rating, a star rating, a numerical rating, or the like. These ratings may then be used as interaction data 510 by matchmaking engine 502. As one example, if first attendee 306 and second attendee 308 both leave a five star review after participating in a one-to-one match with a third attendee, the two attendees 306, 308 may be matched together.

In some embodiments, external data 504, registration data 506, contextual data 508, interaction data 510, or any combination thereof is stored in a database that may be searched to generate matches. In some embodiments, the database is searched using the ELASTICSEARCH search engine providing a distributed, multitenant-capable full-text search engine. Alternatively, any other search engine may be used for embodiments herein.

Figure 6:
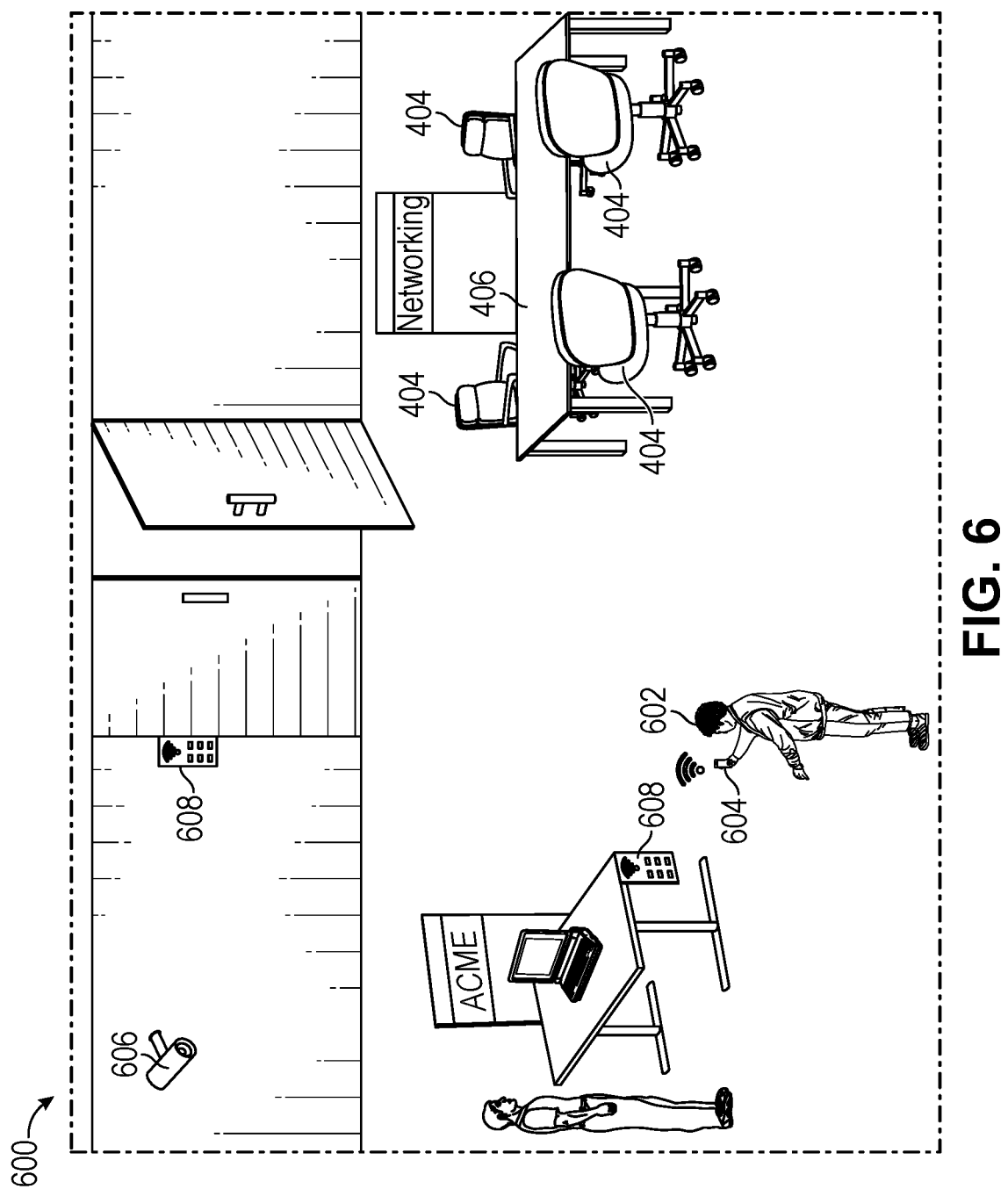
FIG. 6 depicts a system for attending an in-person event.

FIG. 6 depicts an exemplary in-person event 600 for some embodiments. In some embodiments, the in-person event 600 may be a hybrid event, and in-person attendees 602 may physically attend the event in-person but may attend any event activities and communicate with other attendees and presenting users virtually by the event hosting system. Similarly, in-person and virtual attendees may attend the same event, attend the same sessions 210 presented by the presenter (presenting virtually or in-person), and network with other attendees, regardless of attendee type. In-person attendees 602 may each have an associated client device 604, which may be a mobile phone, a tablet, a laptop, or the like, for connecting to the event hosting system. Client device 604 may store attendee profile 252 thereon and allow for check-in to the in-person event via QR codes, bar codes, or other-short range signals.

In some embodiments, cameras 606 are placed at appropriate locations in the event space to monitor the in-person event. In some embodiments, cameras 606 may capture images of in-person attendees 602 and facial recognition software may be used to match the captured images with the stored images of in-person attendees 602 stored in attendee profile 252. During the in-person event 600, camera 606 may capture image data of in-person attendee 602 which may be compared to attendee profile data to determine the identity of in-person attendee 602. When the identity of in-person attendee 602 is determined, a variety of actions may be taken. As described above, in-person attendees 602 may specify whether they are onsite for the event. As such, detection of in-person attendee 602 via facial recognition (or by crossing a geofence, as discussed below) may automatically indicate that in-person attendee 602 is onsite and matchmaking may be adjusted accordingly. As another example, the event hosting system may determine nearby kiosks or attendees having similar interests to in-person attendee 602 and may recommend in-person attendee 602 to network therewith. The event hosting system may automatically perform various actions to provide in-person attendee 602 with a customized experience. In some embodiments, metadata comprising time, date, location, and the like may be stored with the image data such that arrival and movement of in-person attendee 602 may be tracked.

In some embodiments, the event hosting system may integrate with a GPS receiver of client device 604 of in-person attendee 602. The GPS data may be used to determine the location of in-person attendee 602. In some embodiments, the GPS location of in-person attendee 602 may be compared to a threshold boundary location associated with in-person event 600 such as a geofence. When in-person attendee 602 crosses the geofence, the event hosting system may automatically verify in-person attendee 602 using attendee profile 252. In some embodiments, when in-person attendee 602 crosses the geofence to enter in-person event 600, in-person attendee 602 is automatically added to the networking pool. Similarly, in-person attendee 602 may be automatically removed from the networking pool upon crossing the geofence and leaving in-person event 600.

In some embodiments, sensors 608 are disposed at various locations in the event space. Sensors 608 may comprise a short-range communication sensor such as, a BLUETOOTH transceiver, an RFID sensor, or a proximity beacon. In some embodiments, in-person attendees 602 may transmit short-range communication by a proximity card or client device 604 such that sensor 608 detects in-person attendees 602. The signal sent from in-person attendees 602 may be used to locate in-person attendees 602 and may influence matchmaking of in-person attendees 602 to other nearby attendees. In some embodiments, sensors 608 are integrated with the event hosting system (e.g., an event badge) and used to monitor the in-person attendee 602 throughout in-person events.

In some embodiments, the event system may track in-person attendee 602 using cameras 606 and the short-range communication as described above. The event hosting system may utilize facial recognition, short-range communication, and GPS to track the movement of in-person attendee 602. The movement of in-person attendee 602 and/or focus between sessions 210, workshops, networking 212, and other event content may further provide data for enhancing customized experiences for in-person attendee 602. For example, in-person attendee 602 may receive a notification (e.g., via client device 604) upon entry into a lobby of the event space indicating that two attendees in the lobby share similar interests with in-person attendee 602. In-person attendee 602 may then be prompted to approach the two attendees and chat. Similarly, the two attendees may be notified of the approaching in-person attendee 602. As attendees gather throughout the event, in some embodiments, a heat map may be created for the event. The heat map may depict where attendees are congregating. In some embodiments, the heat map may have associated tags 248. The tags 248 may be extracted from tags 248 shared by the congregating attendee. As such, when in-person attendee 602 walks into the event space, in-person attendee 602 may access the heat map and determine a group of other attendees to network with. In another example, in-person attendee 602 may enter the expo area and be detected by any of the above-described sensors. In-person attendee 602 may receive a map of the expo area detailing each booth and highlighting booths that may be of interest to in-person attendee 602 based on any of external data 504, registration data 506, contextual data 508, interaction data 510, or any combination thereof. For example, in-person attendee 602 may be prompted to approach the Acme booth to discuss job openings relevant to in-person attendee 602 based on the attendee profile 252 and documents uploaded to the event hosting system, such as a job posting and in-person attendee's 602 resume.

In some embodiments, incentives are distributed throughout the event to attendees. Incentives may be distributed as points which may be redeemed by the attendees. For example, the attendee may redeem points for a presenter seat 404 for a group networking meeting. In some embodiments, incentives may be provided for attending event activities, time spent at the event activities, registration, presenting at events, networking, promoting sponsors, via social media, and the like. In some embodiments, points are redeemable for reduced fees for registration and events, upgraded tickets, free hotel stays, paid traveling expenses, gift cards, or any other reward selected by the event organizer.

Figure 7:
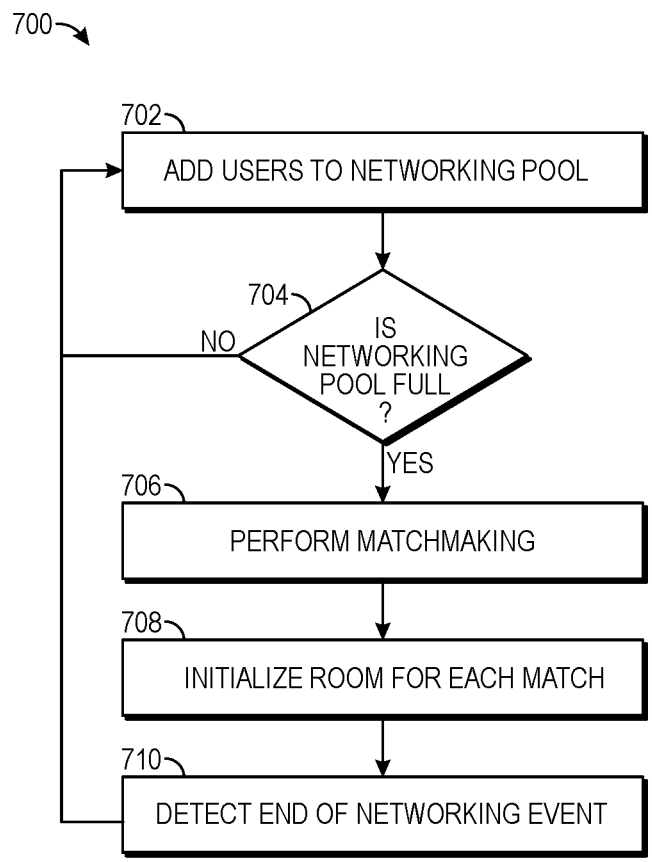
FIG. 7 depicts a flowchart illustrating the operation of a method for matchmaking attendees for some embodiments.

Turning now to FIG. 7, an exemplary method 700 for matchmaking attendees for in-person, virtual, and hybrid events is depicted for some embodiments. Matchmaking may begin at step 702 where attendees are added to the networking pool. As previously described, users may be added to the networking pool upon entering interface 200 or selecting one-to-one networking pane 224 or group networking pane 226. Alternatively, attendees may add a matchmaking session to their agenda and be automatically added to the networking pool upon the start of the matchmaking session. When attending events in-person, an attendee may be automatically added to the networking pool upon entering the event area or may join the networking pool via the event hosting system. The capacity of the networking pool may be set by the event organizer.

At step 704, it may be determined whether the networking pool is full. If the networking pool is not full, processing may proceed back to step 702 and additional attendees may be added to the networking pool. If the networking pool is full, processing may proceed to step 706. As described above, matchmaking may be performed when the networking pool is not full. In some such embodiments, step 704 may be omitted.

At step 706, matchmaking may be performed. In some embodiments, matchmaking is performed once the networking pool reaches capacity. In some embodiments, matchmaking is performed as in-person attendees 602 join the networking pool but networking events are not created until the pool is full or a timer has elapsed. As described above, attendees may be matched on a first-come, first-serve basis, such that attendees are matched in the order in which they joined the networking pool. Alternatively, matchmaking engine 502 may match attendees based on external data 504, registration data 506, contextual data 508, interaction data 510, or any combination thereof. In some embodiments, certain data is weighted more heavily for matchmaking attendees. For example, interaction data 510 may be more heavily weighted than external data 504 which may be considered less reliable.

Next, at step 708, a meeting room may be initialized for each match for conducting the networking event. In some embodiments, the meeting room comprises networking interface 300 for facilitating video conferencing between attendees 306. In some embodiments, meeting presenters 408 may share data to the group networking event while viewing attendees in attendee seats may only view the data shared. In some embodiments, for in-person meetings, in-person attendees 602 are directed towards a specific area of the event space, such as a dedicated meeting room.

Once the networking event ends at step 710, the attendees may be added back to the networking pool. Thereafter, the attendees may be matched with different attendees and continue networking. In some embodiments, attendees 306 are prompted whether they would like to be added to the networking pool after the meeting ends and may exit the pool if desired.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein, without departing from the scope of the invention as recited in the claims.

The invention claimed is:

1. One or more non-transitory computer-readable media storing computer-executable instructions that, when executed by a processor of an event hosting system, perform a method for matchmaking for a virtual event, the method comprising:
    adding a first event attendee of a plurality of event attendees to a networking pool that is managed by the event hosting system;
    responsive to the networking pool reaching a capacity, matching, by the event hosting system, the first event attendee to a second event attendee in the networking pool to obtain a first match and one or more other event attendees from the plurality of event attendees to obtain at least a second match,
    wherein the first event attendee is matched with the second event attendee based in part on a first set of interest data associated with the first event attendee and a second set of interest data associated with the second event attendee;
    generating a first discussion topic for a first virtual event that is accessible by a first set of event attendees included as part of the first match, and a different second discussion topic for a second virtual event that is accessible by a second set of event attendees included as part of the second match, wherein the first discussion topic is generated from a first set of matched data corresponding to the matching of the first set of interest data and the second set of interest data and the second discussion topic is generated from a different second set of matched data on which the second match is made;
    presenting a graphical user interface (GUI) comprising a first graphical element for the first virtual event and a second graphical element for the second virtual event that are available to the first event attendee based on the matching of at least the first match and the second match,
        wherein the first graphical element presents the first discussion topic for the first virtual event, the first set of event attendees that have access to the first virtual event, and an identifier for any of the first set of event attendees that are actively participating in the first virtual event, and
        wherein the second graphical element presents the different second discussion topic for the second virtual event, the second set of event attendees that have access to the second virtual event, and an identifier for any of the second set of event attendees that are actively participating in the second virtual event;
    initiating the virtual event based on the matching of the first event attendee to the second event attendee and a selection of the first graphical element;
    monitoring the virtual event by analyzing interactions between the first event attendee and the second event attendee in video streams of the first event attendee and the second event attendee while the virtual event is active during a part of a first time limit;
    adjusting the first time limit set for the virtual event to a second time limit in response to the interactions between the first event attendee and the second event attendee being indicative of a successful or unsuccessful matching of the first event attendee to the second event attendee, wherein the second time limit is different than the first time limit; and
    responsive to the networking event reaching the second time limit, adding the first event attendee and the second event attendee back to the networking pool by modifying the GUI to terminate the virtual event and to present the networking pool with other virtual events.

2. The media of claim 1, wherein the method further comprises:
    obtaining a first set of behavioral data for the first event attendee and a second set of behavioral data for the second event attendee,
    wherein the first set of behavioral data and the second set of behavioral data comprises at least one of: a visited area associated with the virtual event, a length of time spent at the visited area, or an event agenda, and
    wherein the first event attendee and the second event attendee are further matched based in part on the first set of behavioral data and the second set of behavioral data.

3. The media of claim 1, wherein the method further comprises:
    receiving, from the first event attendee, a block request to prevent matching of the first event attendee to a third event attendee of the plurality of event attendees; and
    responsive to receiving the block request, preventing a match of the first event attendee to the third event attendee.

4. The media of claim 1, wherein the method further comprises:
    responsive to adding the first event attendee and the second event attendee back to the networking pool, matching the first event attendee to a third event attendee and the second event attendee to a fourth event attendee.

5. The media of claim 1, wherein the method further comprises:
    receiving a rule for matching the plurality of event attendees,
    wherein the first event attendee and the second event attendee are further matched based in part on the rule.

6. The method of claim 1, wherein the method further comprises:
    generating a transcript for at least a subset of the virtual event;
    extracting at least one keyword from the transcript; and
    changing the first discussion topic based in part on the at least one keyword.

7. The method of claim 1, wherein generating the first discussion topic comprises:
    determining the first discussion topic based in part on at least one shared interest between the first event attendee and the second event attendee.

8. The method of claim 1, wherein the method further comprises:
assigning one of the first event attendee or the second event attendee to a presenter seat of the virtual event; and
granting a set of privileges for the virtual event to one of the first event attendee or the second event attendee assigned to the presenter seat, wherein the set of privileges comprises at least one of: authorization to share audio data, authorization to share video data, or authorization to share file data.

9. The method of claim 1, wherein adjusting the first time limit comprises:
determining that the interactions over a particular interval correspond to an indication of a poor match between the first event attendee and the second event attendee; and
prompting one or more of the first event attendee and the second event attendee to end the virtual event before the first time limit via the GUI in response to determining that the interactions over the particular interval corresponds to the indication of the poor match.

10. The method of claim 1, wherein adjusting the first time limit comprises:
determining that the interactions over a particular interval corresponds to an indication of a good match between the first event attendee and the second event attendee; and
prompting one or more of the first event attendee and the second event attendee to extend the virtual event past the first time limit via the GUI in response to determining that the interactions over the particular interval corresponds to the indication of the good match.

11. The method of claim 1, wherein analyzing the interactions comprises:
determining behavioral data associated with the first attendee and the second attendee based on audio data and facial expressions from video streams; and
determining the matching of the first event attendee with the second event attendee as a poor match or a good match based on the behavioral data.

12. The method of claim 1 further comprising:
determining that a rule prevents a matching of an event attendee with a first interest or topic preference and another event attendee with a different second interest or topic preference; and
wherein matching the first event attendee to the second event attendee comprises:
determining that the rule is satisfied based on the first set of interest data associated with the first event attendee including the first interest or topic preference and the second set of interest data associated with the second event attendee excluding the second interest or topic preference.

13. The method of claim 1 further comprising:
dynamically determining a third discussion topic that is discussed during a first time of the virtual event from the interactions during the first time;
changing from presenting the first discussion topic to the third discussion topic in the GUI during the first time of the virtual event;
dynamically determining a fourth discussion topic that is discussed during a second time of the virtual event from the interactions during the second time; and
presenting the fourth discussion topic in the GUI during the second time of the virtual event.

14. The method of claim 1, wherein initiating the virtual event comprises:
setting a first time limit for the virtual event;
generating, by the event hosting system, a virtual event interface that combines a first video of the first event attendee with a second video of the second event attendee; and
presenting the virtual event interface on devices of the first event attendee and the second event attendee.

15. The method of claim 1, wherein the second graphical element presents an image of each of the one or more other event attendees at different positions associated with listening and presenting roles for the virtual event.

16. A system for matchmaking for a virtual event, the system comprising:
a processor;
a data store; and
one or more non-transitory computer-readable media storing computer-executable instructions that, when executed by the processor, perform a method for matchmaking for the virtual event, the method comprising:
adding a plurality of event attendees to a networking pool that is managed by the system;
responsive to the networking pool reaching a capacity, matching the plurality of event attendees to obtain a plurality of matches,
wherein each event attendee of the plurality of event attendees is matched based in part on a set of interest data associated with each event attendee,
wherein the plurality of event attendees comprises at least an in-person event attendee and a virtual event attendee, and
wherein the plurality of matches comprises a first match between the in-person event attendee and the virtual event attendee and a second match between the in-person event attendee and one or more other in-person or virtual event attendees of the plurality of event attendees;
generating a first discussion topic for a first virtual event that is accessible by a first set of event attendees included as part of the first match, and a different second discussion topic for a second virtual event that is accessible by a second set of event attendees included as part of the second match, wherein the first discussion topic is generated from a first set of matched data corresponding to the matching of the set of interest data between the in-person event attendee and the virtual event attendee and the second discussion topic is generated from matching a different set of interest data between the in-person event attendee and the one or more other in-person or virtual event attendees;
presenting a graphical user interface (GUI) comprising a first graphical element for the first virtual event and a second graphical element for the second virtual event that are available to the in-person event attendee based on the matching of at least the first match and the second match,
wherein the first graphical element presents the first discussion topic for the first virtual event, the first set of event attendees that have access to the first virtual event, and an identifier for any of the first set of event attendees that are actively participating in the first virtual event, and
wherein the second graphical element presents the different second discussion topic for the second virtual event, the second set of event attendees that have access to the second virtual event, and an identifier for any of the second set of event attendees that are actively participating in the second virtual event;

initiating the virtual event based on a matching of the in-person event attendee to the virtual event attendee and a selection of the first graphical element;

monitoring the virtual event by analyzing interactions between the in-person event attendee and the virtual event attendee in video streams of the in-person event attendee and the virtual event attendee while the virtual event is active during a part of a first time limit;

adjusting the first time limit set for the virtual event to a second time limit in response to the interactions between the in-person event attendee and the virtual event attendee being indicative of a successful or unsuccessful matching of the in-person event attendee to the virtual event attendee, wherein the second time limit is different than the first time limit; and responsive to the networking event reaching the second time limit, adding the in-person event attendee and the virtual attendee back to the networking pool by modifying the GUI to terminate the virtual event and to present the networking pool with other virtual events.

17. The system of claim 16, wherein the method further comprises:
detecting a signal indicative of a location from a device of the in-person event attendee,
wherein the in-person event attendee is automatically added to the networking pool in response to the location corresponding to a physical location associated with a networking event.

18. The system of claim 17, wherein the method further comprises:
suggesting an event booth at the networking event to the in-person event attendee based in part on the signal indicative of the location.

19. The system of claim 16, wherein the method further comprises:
receiving a plurality of attendee locations from a plurality of attendee client devices; and
determining at least one meeting location for the plurality of matches based in part on the plurality of attendee locations.

20. The system of claim 16, wherein the method further comprises:
detecting, by at least one sensor, a length of time spent at a physical location associated with a network event; and
determining the set of interest data based in part on the length of time spent at the physical location associated with the networking event.

* * * * *